(No Model.)
H. Y. BATSON.
ATTACHMENT FOR HOMINY MILLS.
No. 450,606.                              Patented Apr. 21, 1891.
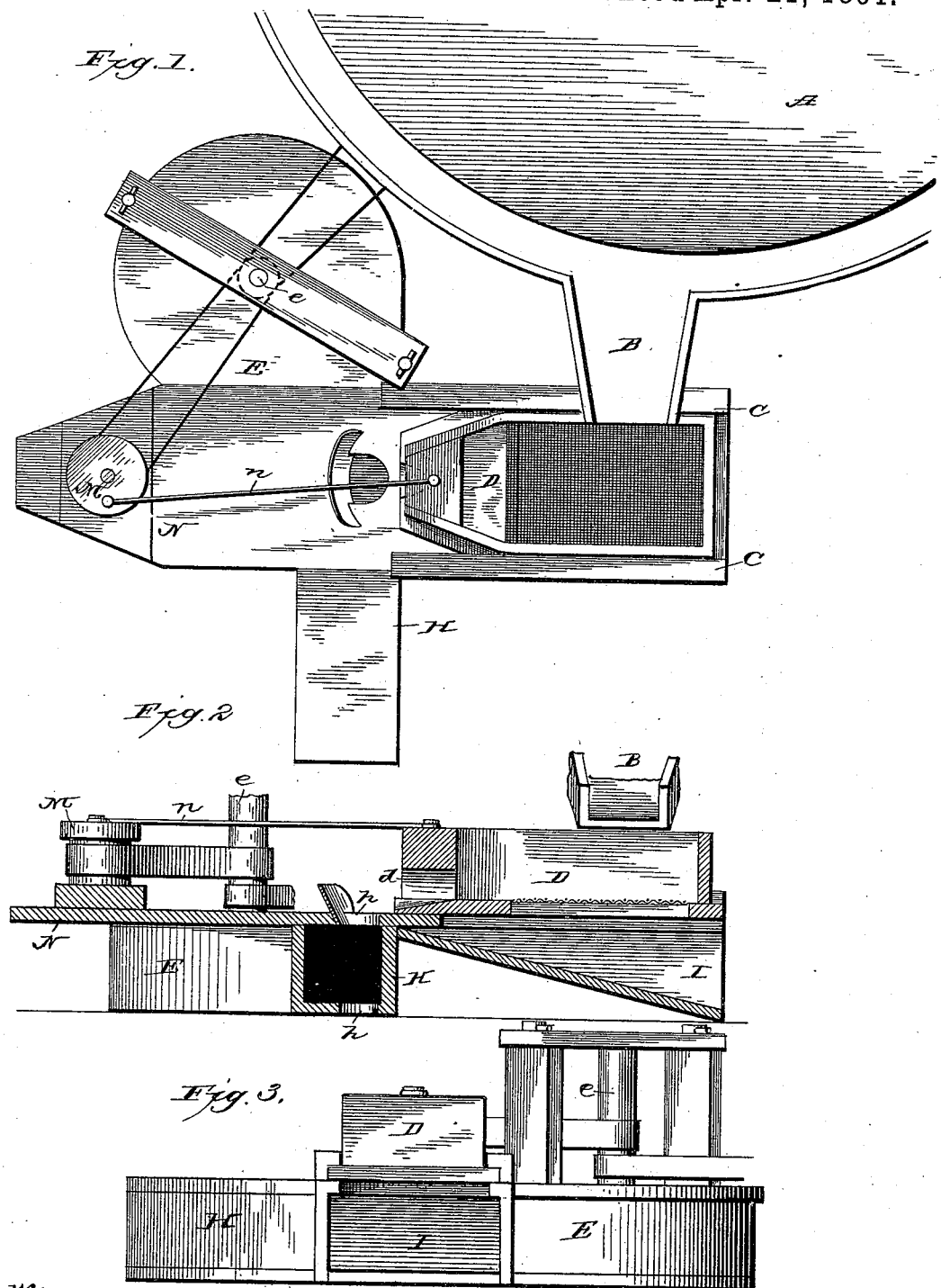

UNITED STATES PATENT OFFICE.

HEZEKIAH Y. BATSON, OF TRAVELLER'S REST, SOUTH CAROLINA.

ATTACHMENT FOR HOMINY-MILLS.

SPECIFICATION forming part of Letters Patent No. 450,606, dated April 21, 1891.

Application filed July 18, 1890. Serial No. 359,163. (No model.)

*To all whom it may concern:*

Be it known that I, HEZEKIAH Y. BATSON, of Traveller's Rest, in the county of Greenville and State of South Carolina, have invented certain new and useful Improvements in Attachments for Hominy-Mills; and I do hereby declare the following to be a full, clear, and exact description of the same, reference being had to the accompanying drawings, forming a part of this specification, and to the letters of reference marked thereon.

This invention has for its object to provide a simple attachment for hominy, grit, or cornmeal mills which will effectually separate and save the meal, then separate the cracked grains from the chaff and bran with little or no loss, the whole device being adapted for application to any ordinary hominy, grit, or cornmeal-mill now in use.

Referring to the accompanying drawings, Figure 1 is a top plan view of a pair of ordinary horizontal millstones for cracking corn into hominy with my attachment applied thereto. Fig. 2 is a section on the line $x\,x$, Fig. 1. Fig. 3 is a side elevation of the attachment alone.

Like letters of reference indicate the same parts in all the figures.

A indicates the crushers or millstones, of any ordinary or preferred construction, adapted to crack the grains of corn into the proper size for hominy; B, the chute through which the hominy tails away from the crushers. At the bottom of this chute is arranged and supported in any suitable manner a frame-work consisting of the guideways C, in which reciprocates the sieve or screen D, and the blower-casing E and blast-passage formed by the casing H. Below the sieve, which is arranged at right angles to the blast-passage, is a drawer, or, better, a chute I, down which the meal passing through the sieve flows, and at the lower end of the sieve the granular portion tails out through an opening $d$ and drops directly across the blast-passage through the openings $h$ in the walls of the same. A blower is located within the casing E, with its shaft $e$ extending above the casing, and having a gear $e'$ thereon meshing with a corresponding gear $e^2$, driven by the belt $e^3$, which passes around a pulley on the crusher-shaft. From the shaft $e$ a belt passes around a crank-pulley M on an extension N of the frame, causing the same to rotate simultaneously with the blower. This pulley is connected through the medium of the connecting-rod $n$ with the lower end of the sieve. Hence as the pulley is rotated the sieve is given a rapid reciprocating movement.

The apertures or openings $h$ in the top and bottom walls of the blast-passage are preferably arranged with the lower one slightly to one side in the direction of the blast in order to compensate for any deflection of the grains by reason of the action of the blast. This form of device, it will be seen, can be made very cheaply, the blast-passage consisting of straight pieces, to one end of which the blower-casing is secured, a single cross-piece serving as a support for the pulley M, and also as a base upon which the sieve may slide, the chute for the meal being built below and the guides for the sieve above the cross-piece. Furthermore, no special driving machinery is necessary and the attachment in its compact form may be applied to any mill now in common use at very slight expense.

In operation the cracked grains and the meal, which is a necessary incident, are tailed into the sieve, where they are shaken about until the meal is sifted out, then tail out of the lower end of the sieve, passing thence directly across and through the blast-passage, where every particle of husk and bran is blown out, the cracked grains dropping below clean and pure.

Any suitable receiver may be provided for the separated products; but as the same form no part of my present invention I have not deemed it necessary to show or describe the same further.

What I claim as new, and desire to secure by Letters Patent, is—

In an attachment for hominy-mills, the combination, with the blower, the casing therefor having the blast-passage extending therefrom, with openings in its top and bottom walls slightly out of line, of the cross-piece rigidly united to said blower-casing at substantially right angles thereto, the reciprocating sieve mounted in ways on the crosspiece above the blast-passage in position to discharge through the openings therein, the meal-receiver below the sieve at one side of the blast-passage, the pulley on the crosspiece driven from the blower-shaft, and the connecting-rod uniting the sieve and pulley, whereby the former is reciprocated, substantially as described.

HEZEKIAH Y. BATSON.

Witnesses:
 JAS. LE ORR,
 T. K. EARLE.